Jan. 29, 1929.　　　　　　　　　　　1,700,537
J. F. KEY
TRANSMISSION OR BRAKE BAND
Filed Jan. 20, 1925

Inventor
James F. Key.
By Lyon & Lyon
Attorneys

Patented Jan. 29, 1929.

1,700,537

UNITED STATES PATENT OFFICE.

JAMES F. KEY, OF SIERRA MADRE, CALIFORNIA, ASSIGNOR OF ONE-HALF TO LEONARD S. LYON, OF LOS ANGELES, CALIFORNIA.

TRANSMISSION OR BRAKE BAND.

Application filed January 20, 1925. Serial No. 3,575.

This invention relates to bands of the type employed, for example, in the planetary transmission of a well known type of automobile.

When the transmission or brake band is of unitary construction, as is customary, and when it is desired to remove and install such type of band, it is necessary to remove the transmission housing. One of the objects of this invention is to provide a sectional transmission band so that such band can be readily removed and installed through the opening in the transmission housing when the cover of said housing is removed.

A prior type of transmission and brake band is of sectional construction, one of the end members being provided with key hole slots and the band strip having headed studs adapted to engage the key hole slots to hold the strip and end member assembled. It is an object of the present invention to produce a stronger construction than this as with such prior construction there is liability of the studs bending and breaking under the strain coming upon them when the band is contracted. With such prior construction, it will be readily seen that, even though there are a plurality of studs and slots, the strain can only come upon one stud at a time and the stud bearing the strain is not merely under a shearing strain, but is also subjected to bending.

The present construction provides for all of the studs being in shear and not subjected to any bending, thus producing a stronger connection between the end member and the band strip.

The accompanying drawings illustrate the invention:

There is provided a band strip 5 and secured to one end of said strip is an end member 6 provided with the usual slotted ear 7. This member 6 is permanently secured, by rivets 8 or their equivalents, to the strip. The lining of the band is indicated at 9.

Figure 3:
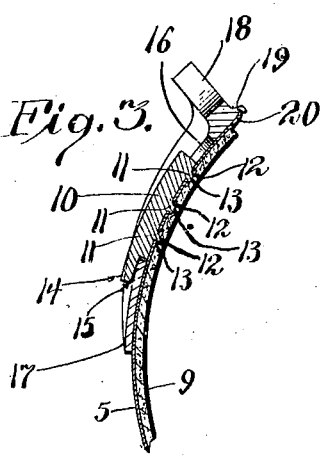
Fig. 3 is a fragmental sectional elevation of the left end of the band shown in Fig. 1.
Figure 4:
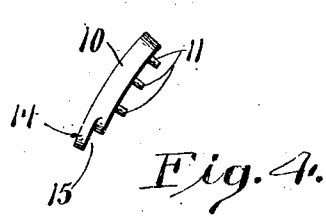
Fig. 4 is an edge view of the connection lug.

To the other end portion of the strip 5 is secured a lug 10 which is preferably a steel forging. This lug 10 is shown detached in Fig. 4 and projecting from one face thereof are studs 11 which extend through holes 12 provided in the strip 5. In assembling the lug 10 in place, the studs 11 will be engaged with the holes 12 and then the studs will be headed as indicated at 13 in Fig. 3. It will be seen that each of the studs 11 has a bearing and is in shear in the strip 5, thus distributing the strain over a comparatively great area of the strip 5 and lug 10. The studs 11 may be ordinary rivets or may be forged integral with the body portion of the lug.

It is to be noted that one of the studs 11 is positioned near the end of the lug that is farthest from the end of the strip on which the lug 10 is secured. Thus, when the strip 5 is under tension, there will be less tendency to bending strain on said stud 11, than would be the case if said stud loosely engaged in a slot as in some prior known transmission band constructions.

The lug 10 has a thinner overhanging portion 14, there being a space 15 between said overhanging portion and the strip 5 to receive one end wall of a slot 16 in an end member 17. The overhanging end portion has its underface substantially parallel with the strip so that an end portion of the end member 17 will engage said under face and thus prevent outward tilting of the other end portion of the end member away from said strip. The end member 17 is provided with the usual slotted ear 18. The function of the ears 7, 18 is well understood in this art as it relates to the contraction of the band for effecting braking, low speed transmission, or reverse drive in a planetary transmission of the type employed on a Ford automobile.

Figure 1:
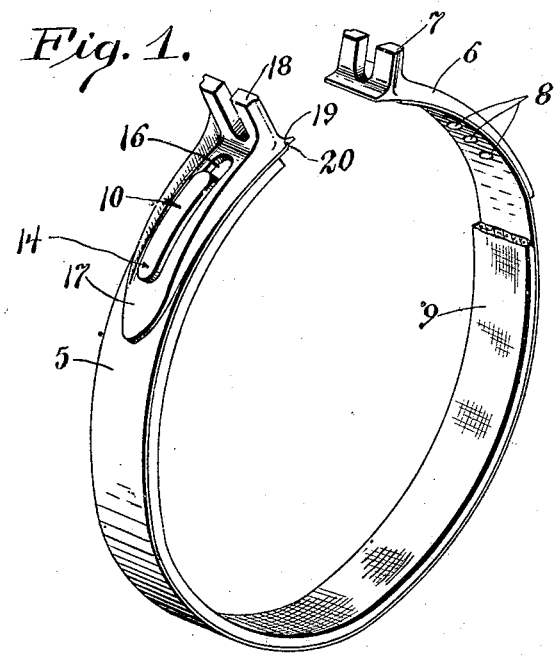
Fig. 1 is a perspective view of a transmission band constructed in accordance with the provisions of this invention.
Figure 2:
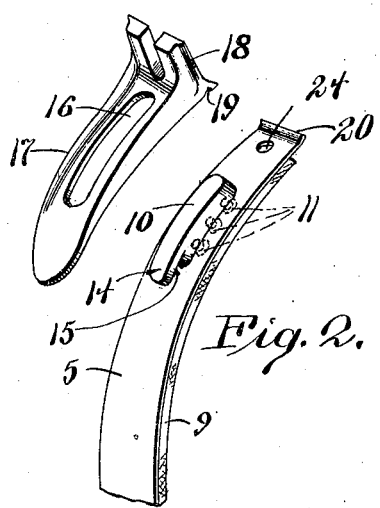
Fig. 2 is a fragmental perspective view of that end portion of the band having the removable end member which is shown detached from the strip.

It will be seen that the overhanging portion 14 engages the outer face of the member 17, the slot 16 being of slightly greater length and width than the lug 10 so as to permit assembling and disassembling of the member 17 on the strip 5. To remove the member 17, it will be necessary to shift it downwardly in Fig. 1 so as to remove the member 17 from beneath the overhanging portion 14 of the lug 10, whereupon the member 17 may be lifted off from the strip 5. Since, in the operation of contracting the band, as is well understood in this art, the tendency is to draw the member 17 under the overhanging portion 14, it is not absolutely necessary that means be provided to yieldingly hold the member 17 against sliding from beneath the overhanging portion; however, it is preferable to employ such means in order to hold the parts assembled before installation in the transmission and such means, in this instance, are constructed as follows:

The member 17 is provided on its inner face, near the end having the ear 18, with a transversely extending groove which forms a transversely extending shoulder 19 which faces the end of the slot 16 engaged by the overhanging portion 14, and the adjacent end of the strip 5 is bent outward slightly, as indicated at 20, so as to engage in said groove, thus placing the adjacent end face of the strip in line with the shoulder 19 so that, in order to slip the member 17 from in under the overhanging portion 14, it is first necessary to press the strip away from the member 17. This may be readily done by placing the thumb upon the outer face of the lug 10 and pressing said lug inwardly.

The foregoing will make clear how the invention is constructed and the band may be assembled in the transmission by first detaching the member 17 from the strip 5 and then inserting one end of the strip through the opening in the top of the transmission housing and bringing said strip into position around the drum, in a manner well understood in this art. Then the member 17 will be slipped into place on the strip 5, as above described.

It will be seen from the foregoing description that the studs 11 are only in shear and that each one of them has a bearing so as to make a very strong connection between the lug 10 and the strip 5, and the lug is itself in shear with the member 17, the area of the bearing between the lug and said member 17 being considerable.

Figure 5:
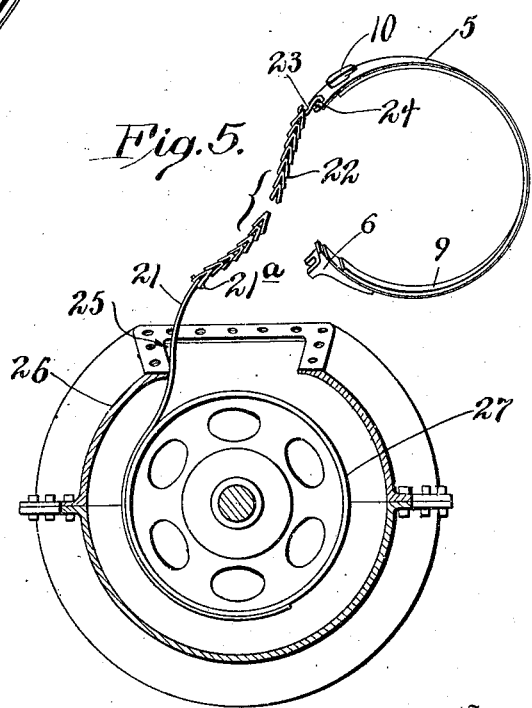
Fig. 5 is a view illustrating the method of installing the transmission or brake band, the transmission housing being shown in section.

To install the band, referring more especially to Fig. 5, a coil spring 21 will be connected at one end by a pin 21ª, or other suitable means, to one end of a flexible member 22, which may be a chain as shown. The other end of the flexible member 22 is provided with a hook 23 and the strip 5 is provided near one end with a hole 24 adapted to be engaged by the hook 23.

That end of the coil spring 21 not attached to the chain 22 will be inserted through the opening 25 of the transmission housing 26 and the inner face of the spring will be engaged with the periphery of the drum 27 near one end of the opening 25. The spring 20 will be forced downwardly through the opening and the coiling tendency of the spring will cause it to closely hug the periphery of the drum 27 and to follow around said drum until the free end of the spring appears below the opening 25 where the operator can readily grasp the same. The operator then draws the free end of the spring through the opening, thus pulling the flexible member 22 around the drum 27 and the end of the strip 5 attached to the hook 23 will be straightened sufficiently to permit the strip to enter the opening 25 and pass around the drum as the chain in pulled by the operator.

Heretofore, in installing sectional bands in the transmission housings of automobiles by prior known methods, the end of the band strip first inserted through the housing opening tends to project outwardly from the periphery of the drum and catch upon obstructions that exist within the housing, thus interfering with drawing of the band into place on the drum. By the new method described above, a considerable saving in time is effected in the installation of sectional brake and transmission bands.

I claim:

1. A transmission band comprising a strip, a lug fixed to the strip and having an overhanging portion, and an end member having a slot to receive the lug and detachably engaging beneath the overhanging portion, the end member having a shoulder facing the end of the slot engaged by the overhanging portion in line with the adjacent end face of the strip to prevent the end member sliding from beneath the overhanging member.

2. A transmission band comprising a strip, an elongate lug having a stud projecting through the strip, the stud being headed on the inner face of the strip, the lug having an overhanging end portion whose under face is substantially parallel with the strip, and an end member having an elongate slot to receive the lug, an end portion of the end member engaging said under face of the overhanging portion, said under face preventing outward movement of the other end portion of the end member away from the strip.

Signed at Los Angeles, California, this 13th day of January, 1925.

JAMES F. KEY.